United States Patent Office 3,414,394
Patented Dec. 3, 1968

3,414,394
SINTERED GLASS ARTICLE AND METHOD
OF MAKING
William J. Poad, Toledo, Ohio, asssignor to Owens-Illinois, Inc., a corporation of Ohio
Filed June 21, 1965, Ser. No. 465,665
2 Claims. (Cl. 65—18)

ABSTRACT OF THE DISCLOSURE

An ultra-fine sintered glass filter having a pore size less than 1.4 microns and greater than 0.9 micron, said filter composed of a fine layer intimately bonded to a coarse layer, and wherein the final filter is produced by screening, compacting and sintering the respective glass frits.

---

This case relates generally to sintered glass filters and a method for forming the same and, more particularly, to sintered glass filters having very small pore sizes as is required in bacterial filtration.

In the forming of sintered glass filters, it is customary to mix ground glass particles of the desired size with any preferred binder, compact the resulting mixture into the desired shape for the finished article and then fire the compacted preform to a temperature sufficient to sinter the particles together so that the resulting filter meets the necessary requirements of strength, pore diameter, and permeability. Generally, a filter should have sufficient physical strength to withstand a pressure differential on the order of 15 pounds per square inch. With regard to pore diameter, the scientific industry has established certain standards. Thus, a very fine porosity grade filter is classified as one in which the largest pores are between 2.0 and 2.5 microns. An ultra-fine porosity grade filter is classified as one in which the largest pores are between 0.9 and 1.4 microns.

While no industry standards have been established regarding permeability, it obviously is desirable that, all other factors being equal, a filter which has a relatively high degree of permeability will be more desirable than one having a lower degree of permeability.

Difficulty has been encountered in providing filters of these grades, particularly filters of the ultra-fine porosity grade in that the permeability rate has been extremely low with the result that filtration operations using such filters required an excessive amount of time. With this prior art deficiency of low permeability in mind, the present invention has as its primary object the providing of a low pore diameter filter having sufficient strength to withstand substantial pressure differentials and yet having a higher degree of permeability than has heretofore been possible.

It is another object of the present invention to provide a filter which is characterized by having a very low porosity grade and yet which has high strength as well as high permeability.

It is a further object of the present invention to provide a filter of very-fine or ultra-fine porosity grade which is more economical than any which have been heretofore available.

A still further object of the present invention is to provide a new method for forming a sintered glass filter.

Another object of the present invention is to provide a method for forming sintered glass filters having improved permeability.

Other objects and advantages of the present invention will become readily apparent from the following detailed description taken in conjunction with the annexed sheet of drawings on which:

Figure 1:
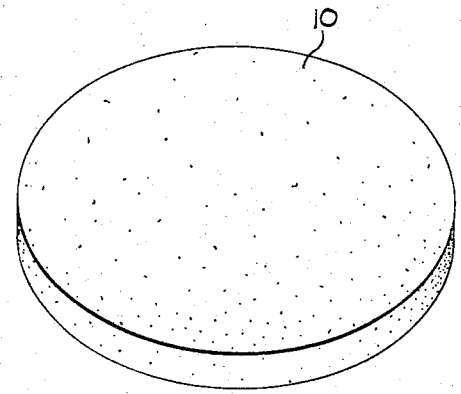
FIGURE 1 is a perspective view of a sintered filter formed according to the present invention.
Figure 2:
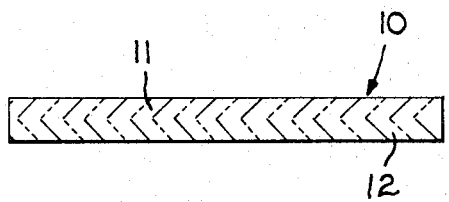
FIGURE 2 is a sectional view taken through the center of the filter illustrated in FIGURE 1.

In brief, the article of the present invention comprises a filter having two layers which have been compacted together to form a unitary article. One of the layers is formed of particles having a size which when compacted will permit the filter to meet the pore size requirement for the particular porosity grade. The other layer is formed of larger particles which serve to provide the filter with the required degree of strength. The method of forming the filter includes mixing the two sizes of frit separately with a binder to form a slurry, drying or partially drying the slurry, separately screening the granulations from each of the slurries, loading the screened granulations from each of the two slurries separately into a mold to form first and second layers, compacting such layers into intimate contact to form a unitary preform and then heating the preform to a sintering temperature to form the desired article.

As shown in the drawings, there is provided a disc shaped filter generally designated by the numeral 10 formed of a first layer 11 and a second layer 12. The first layer 11 is formed from ultra-fine frit in which the average particle size is between 2.4 and 2.8 microns. More specifically, at least fifty percent of the particles are between 2.4 and 2.8 microns in size while at least ninety percent are between 0.3 and 7.2 microns in size.

The second layer is formed from frit having a larger particle size. Preferably, the frit used for the second layer 12 has at least fifty percent of the particles between 5.8 and 10.0 microns in size and at least ninety percent of the particles between 2.0 and 20.0 mcrons in size. The use of particles substantially larger than this for the second layer may result in an imbalance between the two layers and cause warpage during firing.

In forming the filter of the present invention, frit conforming to the above-referenced sizes is separately mixed with an organic binder such as one marketed by Union Carbide Company under the trademark Carbowax. Specifically, Union Carbide Carbowax 20,000 was used. Carbowax 20,000 is a commercially available polyethylene glycol compound with an average molecular weight of 15,000–20,000; a freezing point of 50 to 55; a viscosity cks. at 210° F. of 57.3; an average liquid specific heat per cal./g.° C. of 0.59; a heat of fusion per cal./g. of 41; a surface tension at 25° C. in dynes/cm. of 52; a solubility in water at 20° C. expressed in percent by weight of 60; and, a flash point greater then 465° F. The compound is synthesized by joining polyethylene glycol with a diepoxide, however, it is contemplated that other materials may be used for the binder as is well known in the art. Prior to mixing, the binder may be dissolved in acetone or water or other organic carrier as is well known in the art. The resulting slurry is dried or partially dried to form granulations in which a number of particles are adhered together by the binder. The granulations formed using the ultra-fine frit are then screened through a 40 mesh (U.S. Standard Seive Series) or smaller screen to break out any large granulations or aggregates. The removal of any large granulations permits the material to be compacted at lower pressures than would otherwise be required to achieve a pore size meeting the requirements for the desired filter. This is significant in that the lower the compacting pressure, the higher will be the degree of permeability. Conversely, higher compacting pressures result in lower permeability. Thus, by screening the granulations which will be used for the ultra-fine pore size layer through a 40 mesh or smaller screen, it is possible to compact such granulations to an ultra-fine porosity grade with a pressure on the order of 3,000 pounds per square inch.

This in contrast to pressures on the order of 5,000 to 7,000 pounds per square inch which are required to achieve such pore size if such granulations are not so screened.

In molding the article according to the present invention, a mold having a cavity conforming to the desired configuration of the finished article was filled approximately one-third to one-half full with the granulations screened from a dried or partially dried slurry of ultra-fine frit and a binder. Thereafter, granulations from a slurry of binder and larger particle size frit (fifty percent of the particles were between 5.8 and 10.0 microns in size and ninety percent were between 2.0 and 20.0 microns in size) were placed in the mold over the previously loaded granulations. The resulting mass was compacted under a pressure of 3000 p.s.i. to form a unitary preformed article which was then heated to the required temperature.

The resulting filter had sufficient strength to withstand a differential pressure of 15 pounds per square inch, a maximum filter pore size of 0.9 to 1.4 microns when measured according to a procedure outlined as ASTM Designation E–128–61, and a permeability on the order of .05 to 0.7 milliliter of air per minute per square centimeter of filter area per centimeter of water pressure differential when measured according to a standard testing procedure which is also outlined in the above-referenced ASTM Designation E–128–61. A filter formed according to the present invention may have both layers substantially the same thickness. However, from an economic standpoint, the layer formed from ultra-fine frit should be as thin as possible while still permitting the filter to meet the pore size requirements of the particular porosity grade. Furthermore, the permeability is enhanced by maintaining the ultra-fine frit layer as thin as possible.

While the feature of screening after granulating was conceived primarily to improve the permeability of filters having very small pore sizes, it should be understood that such screening improves the permeability of larger pore size filters as well. Furthermore, this is true regardless of whether the filter is formed from a single layer of uniformly sized frit or is formed from multiple layers of different sized frit. As used in the appended claims, the term "eliminating granulations incapable of passing through a 40 mesh screen" should be understood to mean breaking up as well as screening out large granulations.

It can be readily seen from the foregoing that the present invention provides a sintered glass filter superior to any which have been heretofore available and yet which is more economical. Additionally, it provides a new and novel method for forming sintered glass filters.

Numerous modifications may be resorted to within the spirit and scope of the appended claims.

I claim:
1. The method of forming an ultra-fine filter having an effective pore size of about 0.9–1.4 microns and a permeability of about .05–.7 milliliter of air per minute per square centimeter of filter area per centimeter of differential pressure, said method comprising the steps of: selecting ground glass frit for a first layer and a second layer, the frit for said first layer being formed of particles in which about 50% are between 2.4 and 2.8 microns in size and about 90% are between 0.3 and 7.2 microns in size, and the frit for said second layer being formed of particles of which about 50% are between 5.8 and 10.0 microns in size and about 90% are between 2.0 and 20.0 microns in size; creating a slurry medium consisting essentially of a binder and a suitable carrier for said binder; mixing the frit for said first layer with portions of said slurry medium, and mixing the frit for said second layer with other portions of said slurry medium thereby forming a first slurry and a second slurry respectively; substantially drying said respective first and second slurries, and separating from the resultant dried granulations those aggregates larger than about 40 mesh while maintaining the smaller granulations from said first slurry separate from those of said second slurry; placing the latter granulations from one of said slurries in a mold and placing the granulations from the other of said slurries in intimate contact therewith, compacting said granulations at a pressure in the order of 2000–5000 pounds per square inch into a unitary preform and sintering.

2. An article of manufacture produced in accordance with the method of claim 1.

References Cited

UNITED STATES PATENTS

| | | | |
|---|---|---|---|
| 1,742,411 | 1/1930 | Muller | 210—510 X |
| 2,114,748 | 4/1938 | Pravsnitz | 210—510 X |
| 2,464,517 | 3/1949 | Kurtz | 210—510 X |
| 2,826,265 | 3/1958 | DeWoody | 55—523 X |
| 1,118,441 | 11/1914 | Porter | 65—18 XR |
| 2,390,354 | 12/1945 | Clapp. | |
| 3,010,839 | 11/1961 | Drumheller et al. | 65—18 XR |

DONALL H. SYLVESTER, *Primary Examiner.*

F. W. MIGA, *Assistant Examiner.*